US010406964B1

(12) United States Patent
    Thompson

(10) Patent No.: US 10,406,964 B1
(45) Date of Patent: Sep. 10, 2019

(54) STAKE POCKET TIE DOWN

(71) Applicant: James R. Thompson, Port Orchard, WA (US)

(72) Inventor: James R. Thompson, Port Orchard, WA (US)

(*) Notice: Subject to any disclaimer, the term of this patent is extended or adjusted under 35 U.S.C. 154(b) by 38 days.

(21) Appl. No.: 15/825,854

(22) Filed: Nov. 29, 2017

Related U.S. Application Data

(60) Provisional application No. 62/474,892, filed on Mar. 22, 2017.

(51) Int. Cl.
    B60P 7/06 (2006.01)
    B60P 7/08 (2006.01)
    B60P 3/40 (2006.01)

(52) U.S. Cl.
    CPC .............. B60P 7/0807 (2013.01); B60P 3/40 (2013.01)

(58) Field of Classification Search
    CPC .................................. B60P 7/0807; B60P 3/40
    See application file for complete search history.

(56) References Cited

U.S. PATENT DOCUMENTS

| 1,216,214 | A | | 2/1917 | Connell | |
|---|---|---|---|---|---|
| 3,779,502 | A | * | 12/1973 | Marberg | B65D 19/44 410/116 |
| D307,187 | S | | 4/1990 | Schaf | |
| 5,052,581 | A | | 10/1991 | Christ et al. | |
| 5,141,277 | A | * | 8/1992 | Alexander | B60P 7/0807 296/43 |
| D388,883 | S | | 1/1998 | Thivierge et al. | |
| 5,823,725 | A | * | 10/1998 | Goodwin | B60P 7/0807 410/117 |
| 6,691,825 | B2 | | 2/2004 | Haig | |
| 6,698,548 | B1 | | 3/2004 | Verrill | |
| 6,932,551 | B1 | * | 8/2005 | Bagley | B60P 7/0815 296/37.6 |
| 8,469,148 | B2 | | 6/2013 | Perry | |
| 8,974,161 | B1 | * | 3/2015 | Hemphill | B60P 7/0807 410/106 |
| 9,701,254 | B2 | * | 7/2017 | O'Regan | B60R 9/00 |
| 2007/0181761 | A1 | | 8/2007 | Astor | |
| 2009/0133616 | A1 | * | 5/2009 | Karnes | B62D 33/0207 116/173 |
| 2010/0200331 | A1 | | 8/2010 | Hager | |
| 2013/0220951 | A1 | | 8/2013 | Dufour | |
| 2017/0361756 | A1 | * | 12/2017 | Marchlewski | B62D 33/0207 |

* cited by examiner

*Primary Examiner* — Lori L Lyjak
(74) *Attorney, Agent, or Firm* — Cramer Patent & Design, PLLC; Aaron R. Cramer

(57) ABSTRACT

A stake pocket tie-down and a flatbed trailer that uses that stake pocket tie down. The stake pocket tie-down includes post section that fits into a stake opening of the flatbed trailer. The post section includes a pass-through opening and a top stationary platform having a shoulder for resting on a stake opening. A rotating base having a retention collar is located above the stationary platform. A rotating post is fixed to the rotating base and passes through and is rotatingly attached to the stationary platform. A swiveling D-ring is connected to the retention collar. That ring can rotate relative to the stationary platform. A securing device having a handle passes through the pass-through opening. A retention device retains the securing device in the pass-through opening.

20 Claims, 5 Drawing Sheets

STAKE POCKET TIE DOWN

RELATED APPLICATIONS

The present invention was first described in and claims the benefit of U.S. Provisional Application No. 62/474,892 filed Mar. 22, 2017, the entire disclosures of which are incorporated herein by reference.

FIELD OF THE INVENTION

The present invention relates generally to tractor-trailer trucks. More particularly, the present invention relates to self-aligning stake pocket tie-downs used on flatbed trucks.

BACKGROUND OF THE INVENTION

Countless tractor-trailer trucks crisscross our country every day delivering just about everything we touch in our daily lives. Rapid, efficient, and highly cost-effective large "18-wheelers" have proved themselves to be highly versatile vehicles that can deliver just about anything just about anywhere.

A very common type of tractor-trailer truck that is often used to move large or bulky objects, such as PVC and metal pipe, steel cables, motors and generators, bulk materials and the like is the flatbed truck trailer. Flatbed truck trailers have a major advantage over other types of rigs in that they allow open access to three (3) sides of the truck trailer which makes loading and unloading relatively fast and simple and readily done by lifts, hoists, and cranes, as well as by various loading ramps.

Flatbed truck trailers have an additional advantage over other types of trucks in that the enable easy securing of loads, particularly odd-sized and/or top-heavy loads. Typically securing loads to a trailer bed is performed using one (1) or more straps. One (1) very common type of strap is the ratcheting strap. A ratcheting strap includes not only a strap but one (1) or more ratcheting mechanisms that provide a mechanical advantage which assists securely attaching the load to the trailer bed. Such ratcheting straps also include a release mechanism which removes the high attachment forces and which enables a ratcheting strap to be easy removed.

Ratcheting straps are usually designed to attach to D-rings. A trailer flatbed will have numerous D-ring stake tie downs that are distributed along the perimeter of the flatbed in mounting holes. For safety, the ratcheting straps should be attached perpendicular to the axis of the D-ring. Otherwise an off-axis attachment can cause a D-ring to fail or can cause the entire stake tie down to pull out of its mounting hole.

As a load is being tied down workers constantly reposition the ratcheting straps relative to the load. This necessitates climbing on and off the truck and truck bed, thereby exposing workers to possible falls and other injuries. In addition, constantly repositioning multiple ratcheting straps takes an inordinate amount of time, which translates into lost revenue and excessive downtime.

Accordingly, there exists a need for D-ring style stake tie-downs that automatically position themselves so that they properly accept ratcheting straps from any direction. Ideally, such stake tie downs would be safe and easy to use, would not require modification to existing flatbeds, and could be made available at relatively low-cost.

SUMMARY OF THE INVENTION

The principles of the present invention provide for stake tie-downs that automatically position themselves to properly accept ratcheting straps from any direction. Such stake tie-downs are safe and easy to use, do not require modification to existing flatbeds, and are suitable to being made available at relatively low-cost.

A stake pocket tie-down in accord with the present invention includes a post section that is configured to fit into a stake opening of a transportation device. The post section includes a pass-through opening that passes through a lower portion of the post section, and a top stationary platform having a shoulder for resting on a stake opening. A rotating base is located above the stationary platform. That rotating base has a retention collar and an affixed rotating post. The rotating post passes through and is rotatingly attached to the stationary platform. A ring is connected to the retention collar.

In practice, the ring is a "D" ring which preferably can swivel in the retention collar. In addition, the ring and the rotating base can rotate relative to the stationary platform. In practice, the retention collar is welded to the rotating base while the rotating post projects downward and is welded to the rotating base. Preferably the rotating post is centrally located on the rotating base. Also included might be a securing device that passes through the pass-through opening. That securing device may include a pull handle and a retention device for retaining the securing device in the pass-through opening.

A flatbed trailer in accord with the present invention includes a flatbed having a stake opening and a post section within the stake opening. The post section includes a pass-through opening that passes through a lower portion of the post section, and a top stationary platform having a shoulder resting on the stake opening. A rotating base is located above the stationary platform. That rotating base has a retention collar. A rotating post is fixed to the rotating base and passes through and is rotatingly attached to the stationary platform. A ring is connected to the retention collar. The post section includes a pass-through opening that passes through a lower portion of the post section, and a top stationary platform having a shoulder resting on the stake opening.

In practice, the ring is a "D" ring which preferably can swivel in the retention collar. In addition, the ring and the rotating base can rotate relative to the stationary platform. In practice, the retention collar is welded to the rotating base while the rotating post projects downward and is welded to the rotating base. Preferably the rotating post is centrally located on the rotating base. Also included maybe a securing device that passes through the pass-through opening. That securing device may include a pull handle as well as a retention device for retaining the securing device in the pass-through opening.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
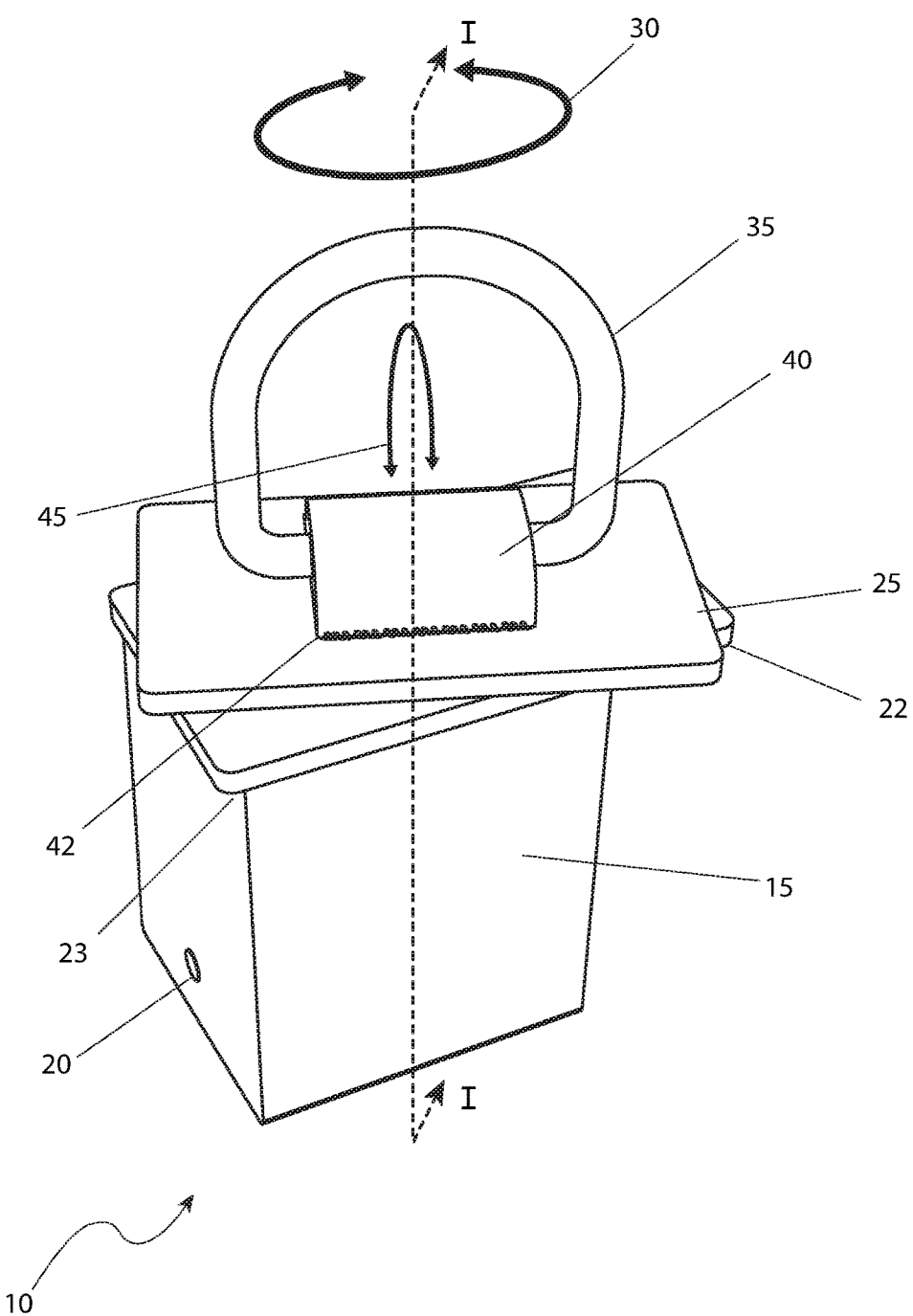
FIG. 1 is an isometric view of a stake pocket tie down with rotating D-ring 10 that is in accord preferred embodiment of the present invention.

DESCRIPTIVE KEY 10 stake pocket tie down with rotating D-ring
15 post section
20 pass-through opening
22 stationary platform
23 shoulder
25 rotating base
30 travel path "R"
35 D-ring
40 retention collar
42 first welded connection
45 travel path "s"
50 securing device
55 pin body
60 pull handle
65 retention device
70 travel path "A"
75 securing hole
80 travel path "b"
85 rotating post
90 second welded connection
95 flatbed
100 load
105 ratcheting load straps
110 stake pockets
115 first position
120 second position

DETAILED DESCRIPTION OF THE PREFERRED EMBODIMENT

The preferred embodiment of the present invention is depicted in FIGS. 1 through 5. However, the invention is not limited to the specifically described embodiment. A person skilled in the art will appreciate that many other embodiments of the invention are possible without deviating from the basic concept of the invention. Any such work around will also fall under the scope of this invention.

The terms "a" and "an" as used herein do not denote a limitation of quantity, but rather denote the presence of at least one (1) of the referenced items.

Refer now to FIG. 1 for an isometric view of a stake pocket tie down with rotating D-ring 10 that is in accord with the preferred embodiment of the present invention. The stake pocket tie down with rotating D-ring 10 includes a post section 15 which fits into a stake pocket 110 (see FIG. 5) opening on a truck, trailer, or similar flatbed 95 vehicle. The post section 15 has a standard size and dimension such that it can be used on almost all makes and model of flatbed 95 vehicles. The post section 15 can be solid, hollow, or "U"-shaped. The particular usage or omission of any particular structure of the post section 15 is not intended to be a limiting factor of the stake pocket tie down with rotating D-ring 10.

Near the bottom of post section 15 is a pass-through opening 20 that is used with a securing device 50 as is described in more detail subsequently. The post section 15 also includes a top stationary platform 22. The stationary platform 22 is preferably an integrally formed part of the post section 15 so as to provide maximum strength (by making it a one-piece element). Alternatively, it can be permanently attached via welding or it can be connected by some other strong attachment mechanism. The stationary platform 22 provides a shoulder 23 for the stake pocket tie down with rotating D-ring 10 as it rests in a stake pocket 110 (see FIG. 5).

Figure 3:
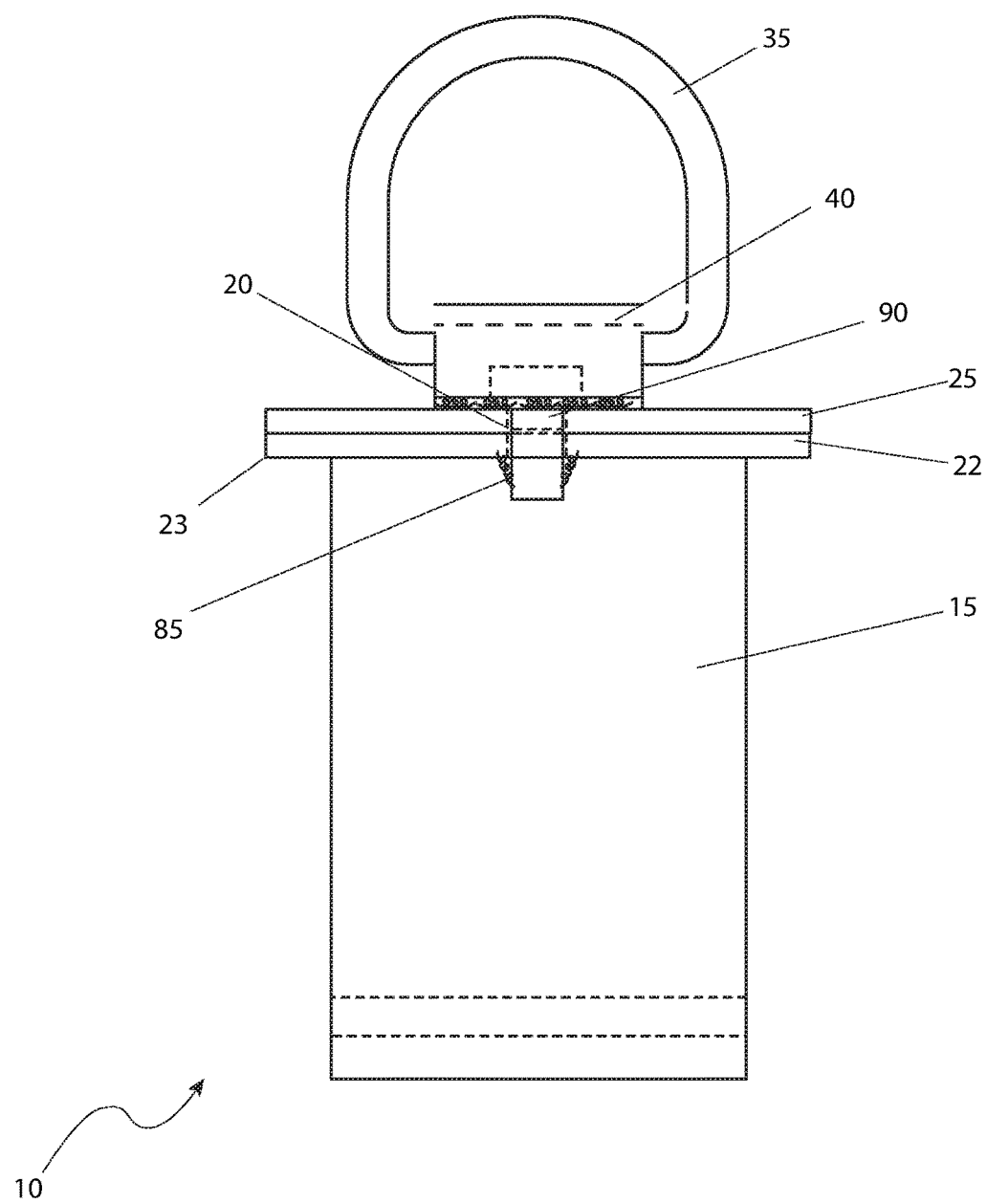
FIG. 3 is a sectional view of the stake pocket tie down with rotating D-ring 10 taken along line I-I of FIG. 1.

Still referring now to both FIG. 1 and FIG. 3, above the stationary platform 22 is a rotating base 25. The rotating base 25 is welded to a centrally located, downward projecting rotating post 85. The rotating post 85 passes through the stationary platform 22. The rotating post 85 can rotate relative to the stationary post 22.

Referring now primarily to FIG. 1, a D-ring 35 is connected to the rotating base 25 via a retention collar 40. For convenience of assembly the retention collar 40 is preferably welded to the rotating base 25 by a first welded connection 42. Alternatively, while more expensive to achieve the retention collar 40 could be integrally formed as a single piece unit with the rotating base 25. In any event the construction of the retention collar 40, D-ring 35, rotating base 25, rotating post 85 and the stationary platform 22 is such that the D-ring 35 can swivel one hundred eighty degrees (180°) as indicated by a travel path "S" 45 and three hundred sixty degrees (360°) as indicated by a travel path "R" 30.

All components of the stake pocket tie down with rotating D-ring 10 are envisioned to be manufactured of a strong, easily weldable, and durable metal such as carbon steel. After manufacture, a suitable protective finish such as paint or plating is applied to prevent corrosion.

Figure 2:
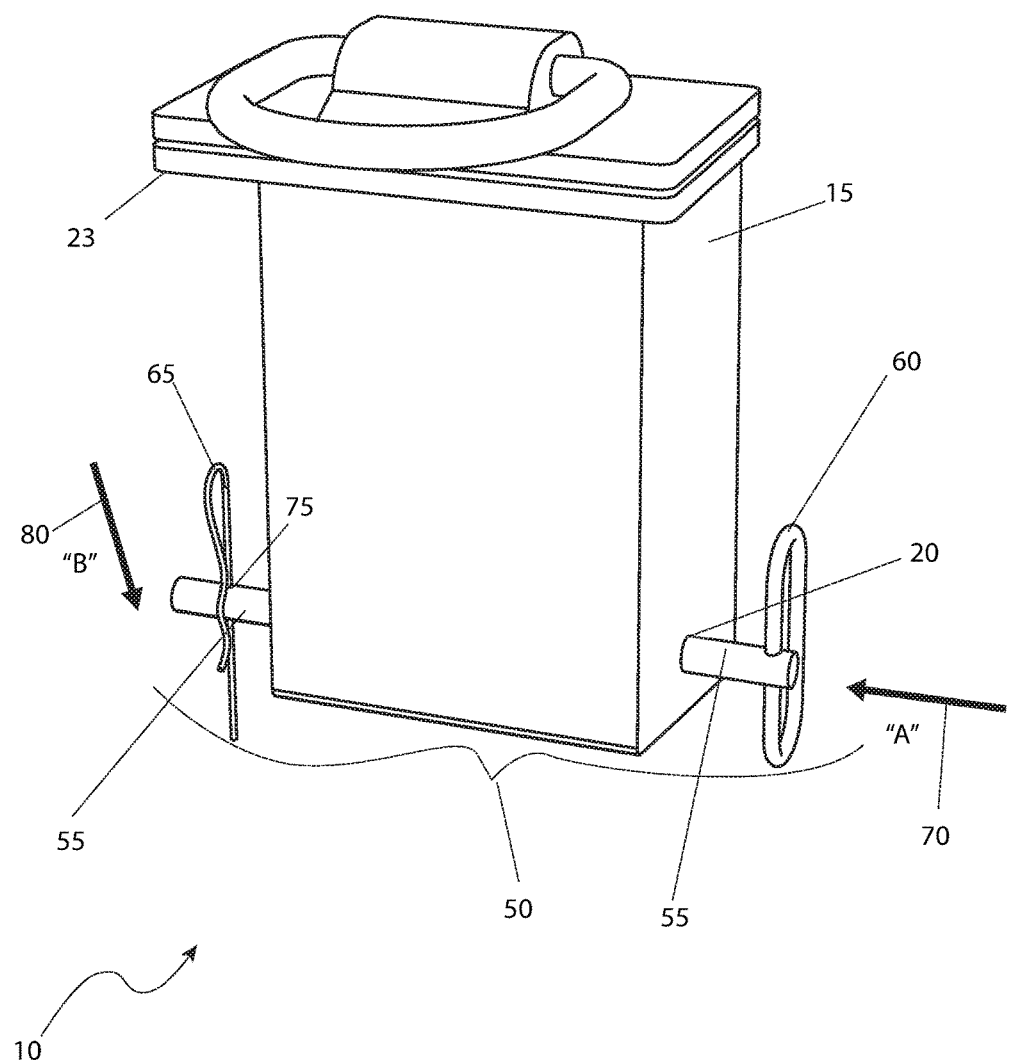
FIG. 2 is an isometric view of the stake pocket tie down with rotating D-ring 10 of FIG. 1 shown with a securing device 50.

Refer now to FIG. 2 for a view of a securing device 50 installed through the pass-through opening 20. Also refer to FIG. 5 for a view of how the securing device 50 attaches the stake pocket tie down with rotating D-ring 10 to a flatbed trailer 95. The securing device 50 includes a pin body 55, a pull handle 60 at the proximal end of the securing device 50, and a retention device 65 at the distal end. After the post section 15 is placed within the stake opening 110 a user would insert the pin body 55 through the pass-through opening 20 along a travel path "A" 70. The pin body 55 is then secured in place by attaching the retention device 65, such as a cotter pin or the like, through a securing hole 75 following a travel path "B" 80. The securing device 50 prevents the stake pocket tie down with rotating D-ring 10 from separating from the flatbed trailer 95.

FIG. 3 presents a sectional view of the stake pocket tie down with rotating D-ring 10 as seen along line I-I of FIG. 1. FIG. 3 illustrates the relationships of the stationary platform 22 to the post section 15 and the rotating base 25 to the retention collar 40. As shown, the circular rotating post 85 is centrally located through the stationary platform 22 and is attached to the rotating base 25 via a second welded connection 90. In use a lubrication agent such as grease would be applied to the rotating post 85 to assist its rotation. FIG. 3 also shows the relationship between the D-ring 35 and the retention collar 40, as well as the retention collar 40 and the rotating base 25.

Figure 4:
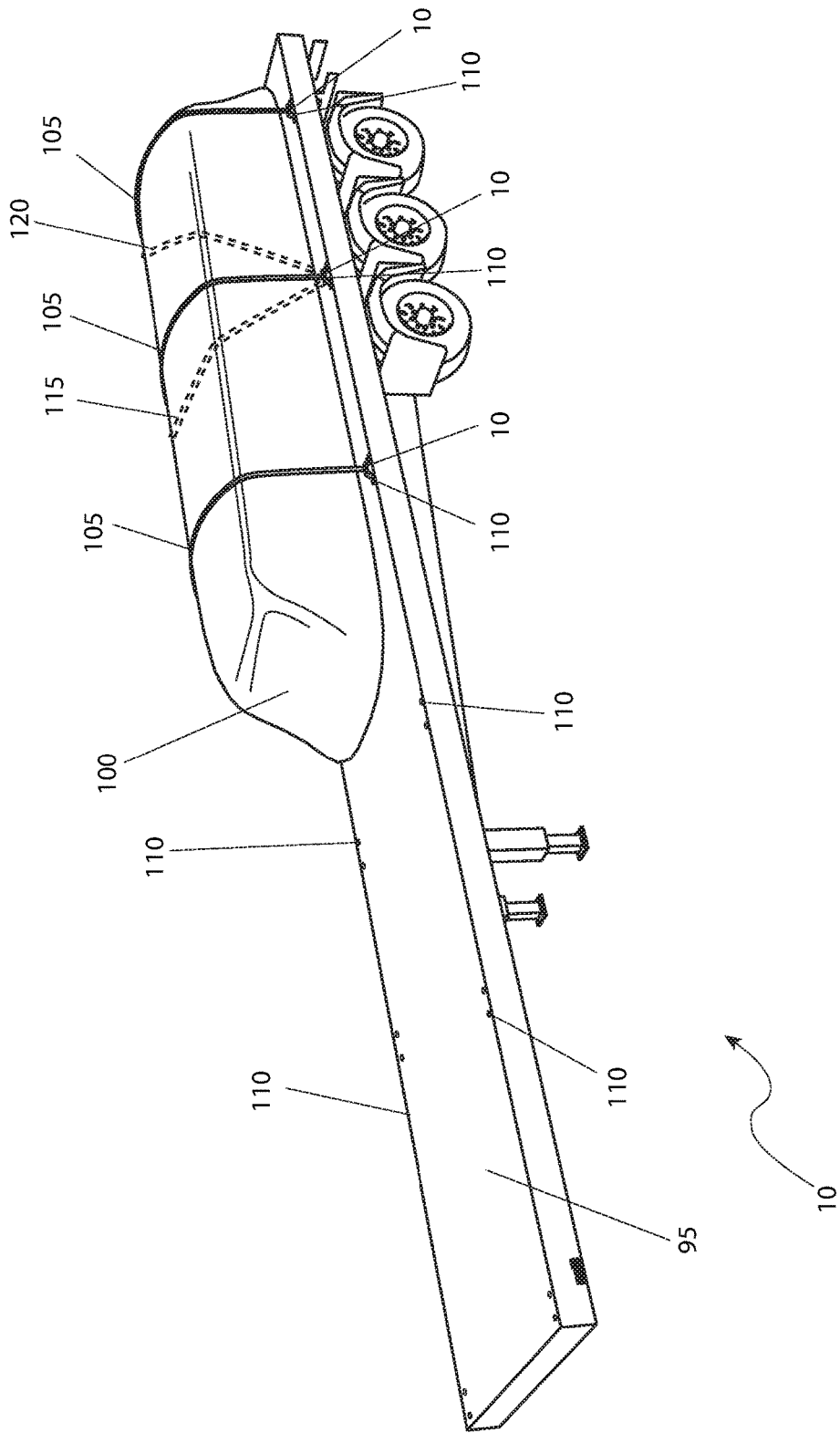
FIG. 4 is perspective view of in-use stake pocket tie downs with rotating D-ring 10 of FIG. 1 securing a load to a flatbed 95; and, FIG. 5 illustrates how a stake pocket tie down with rotating D-ring 10 is secured to a stake pocket.
Figure 5:
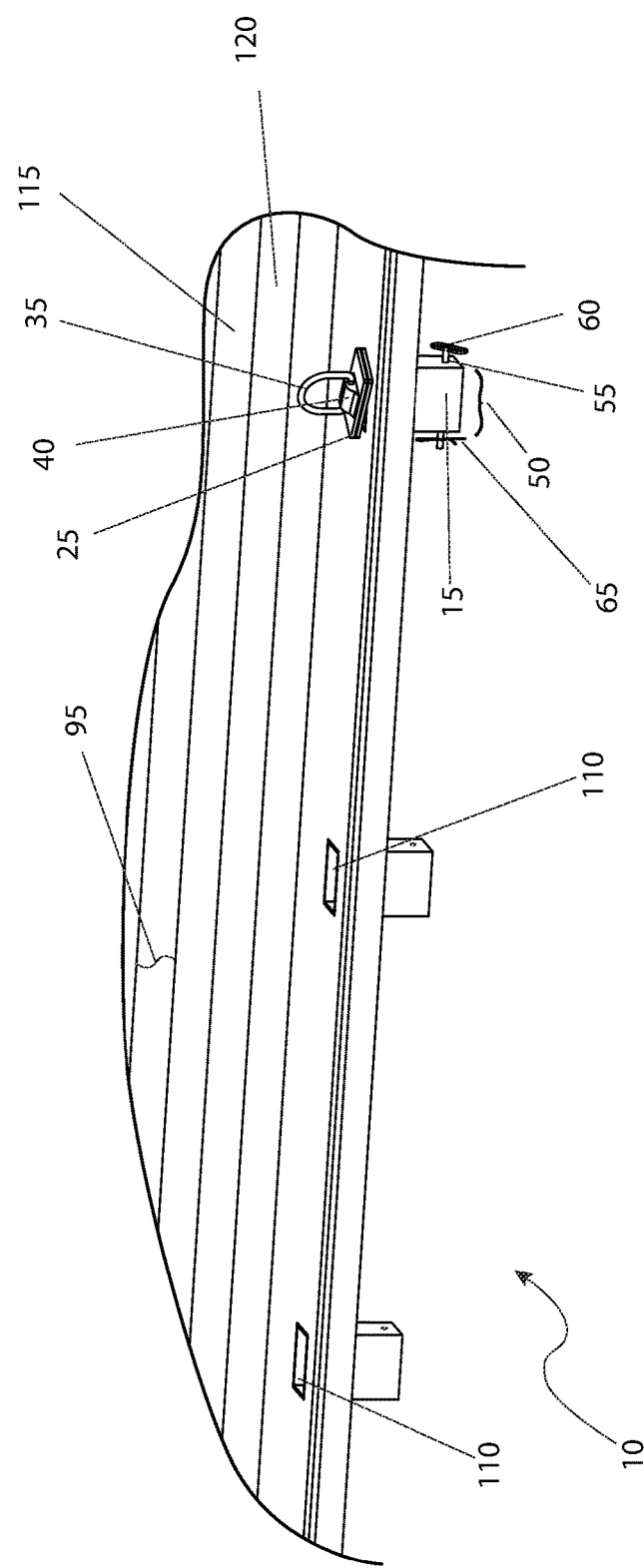

FIG. 4 presents a perspective view of the stake pocket tie down with rotating D-ring 10 in use on a flatbed 95. A load 100 is placed on the flatbed 95 in a conventional manner, which means that it is located so that its weight is properly distribution for safety. Ratcheting load straps 105 are connected between selected stake pockets 110. The swiveling nature of the stake pocket tie down with rotating D-ring 10 provided by the rotating base 25 (see FIG. 1 and FIG. 3) and the "D" ring 35 enable the forces applied by the ratcheting load straps 105 to cause the D-rings 35 to rotate so as to maintain center axis alignment with the ratcheting load straps 105. This reduces the occurrence of problematic events such as broken D-rings, disengagement from the stake pockets, or the like.

In addition, the ratcheting load straps 105 can be applied in an arc as shown by the dotted first and second positions 115 and 120. Realignment associated with moving the ratcheting load straps 105 from the first position 115 to the second position 120 can occur while a worker is on the flatbed 95, thus eliminating the need for the worker to dismount and thereby reducing the dangers from falls.

The preferred embodiment of the present invention can be utilized by the common user in a simple and effortless manner with little or no training. It is envisioned that stake pocket tie down with rotating D-ring 10 constructed in general accordance with FIG. 1 through FIG. 3 would be procured by a user. When attaching a load 100 to the flatbed 95 the stake pocket tie down with rotating D-ring 10 would be deployed around the load 100 in selected stake pockets 110 as shown in FIG. 4. Deployment would include removing the securing devices 50 from the post sections 15 (see FIG. 5) prior to insertion in the stake pockets 110. Next, a post section 15 would be inserted into a stake pocket 110 such that its shoulder 23 rests upon the loading surface of the flatbed 95. Subsequently, each stake pocket tie down with rotating D-ring 10 would be secured by placing a pin body 55 through the pass-through opening 20 such that the securing hole 75 is visible on the opposite side of the post section 15, again, reference FIG. 5. Next, the retention device 65 is inserted through the securing hole 75, thus securing the stake pocket tie down with rotating D-ring 10 in place.

Final engagement of a stake pocket tie down with rotating D-ring 10 continues by connecting each ratcheting load strap 105 over the load 100 and attaching the ratcheting load straps 105 to respective D-rings 35 on the stake pocket tie down with rotating D-rings 10. As the ratcheting load straps 105 are tightened the rotational motion afforded by the rotating base 25 cause the ratcheting load straps 105 to swing in an arc, such as from first or second positions 115, 120 to self-align the ratcheting load straps 105 properly on the load 100. This motion is accomplished while a worker is on the flatbed 95. The rotational motion ensures proper usage of the ratcheting load straps 105 and maintains proper alignment during hauling.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A stake pocket tie-down, comprising:
    a post section configured to fit into a stake opening of a transportation device, said post section includes a pass-through opening that passes through a lower portion of said post section and a top stationary platform having a shoulder for resting on a stake opening;
    a rotating base above said stationary platform, said rotating base having a retention collar;
    a rotating post fixed to said rotating base and passing through said stationary platform, said rotating post rotatingly connected to said stationary platform; and,
    a ring connected to said retention collar.

2. The stake pocket tie-down according to claim 1, wherein said ring is a D-ring.

3. The stake pocket tie-down according to claim 2, wherein said D-ring can swivel in said retention collar.

4. The stake pocket tie-down according to claim 1, wherein said ring can rotate relative to said stationary platform.

5. The stake pocket tie-down according to claim 1, wherein said retention collar is welded to said rotating base.

6. The stake pocket tie-down according to claim 1, wherein said rotating post projects downward from and is welded to said rotating base.

7. The stake pocket tie-down according to claim 6, wherein said rotating post is centrally located on said rotating base.

8. The stake pocket tie-down according to claim 1, further including a securing device that passes through said pass-through opening.

9. The stake pocket tie-down according to claim 8, further including a pull handle on said securing device.

10. The stake pocket tie-down according to claim 9, further including a retention device for retaining said securing device in said pass-through opening.

11. A flat-bed trailer, comprising:
    a flatbed having a stake opening;
    a post section within said stake opening, said post section including a pass-through opening that passes through a lower portion of said post section and a top stationary platform having a shoulder resting on said stake opening;
    a rotating base above said stationary platform, said rotating base having a retention collar;
    a rotating post fixed to said rotating base and passing through and rotatingly attached to said stationary platform; and,
    a ring connected to said retention collar.

12. The stake pocket tie-down according to claim 11, wherein said ring is a D-ring.

13. The flat-bed trailer according to claim 11, wherein said ring can swivel in said retention collar.

14. The flat-bed trailer according to claim 13, wherein said ring can rotate relative to said stationary platform.

15. The flat-bed trailer according to claim 11, wherein said retention collar is welded to said rotating base.

16. The flat-bed trailer according to claim 11, wherein said rotating post projects downward from and is welded to said rotating base.

17. The flat-bed trailer according to claim 16, wherein said rotating post is centrally located on said rotating base.

18. The flat-bed trailer according to claim 11, further including a securing device that passes through said pass-through opening.

19. The flat-bed trailer according to claim 18, further including a pull handle on said securing device.

20. The flat-bed trailer according to claim 19, further including a retention device for retaining said securing device in said pass-through opening.

* * * * *